US012366084B2

(12) United States Patent
Jang

(10) Patent No.: US 12,366,084 B2
(45) Date of Patent: Jul. 22, 2025

(54) ROTATION TYPE NATIONAL FLAG HOISTING POLE TO MINIMIZE RAINWATER ADHESION AREA OF NATIONAL FLAG

(71) Applicant: Yong Su Jang, Jeonju-si (KR)

(72) Inventor: Yong Su Jang, Jeonju-si (KR)

( * ) Notice: Subject to any disclaimer, the term of this patent is extended or adjusted under 35 U.S.C. 154(b) by 0 days.

(21) Appl. No.: 17/920,365

(22) PCT Filed: May 23, 2022

(86) PCT No.: PCT/KR2022/007281
§ 371 (c)(1),
(2) Date: Oct. 20, 2022

(87) PCT Pub. No.: WO2022/250395
PCT Pub. Date: Dec. 1, 2022

(65) Prior Publication Data

US 2024/0209652 A1 Jun. 27, 2024

(30) Foreign Application Priority Data

May 26, 2021 (KR) ........................ 10-2021-0067466

(51) Int. Cl.
*E04H 12/32* (2006.01)
*G09F 17/00* (2006.01)

(52) U.S. Cl.
CPC ..... *E04H 12/32* (2013.01); *G09F 2017/0025* (2013.01)

(58) Field of Classification Search
CPC ............. E04H 12/32; G09F 2017/0025; G09F 2017/0066; G09F 17/00
See application file for complete search history.

(56) References Cited

U.S. PATENT DOCUMENTS 756,989 A * 4/1904 Suhr ........................ G09F 17/00 116/174
1,306,915 A * 6/1919 Klamroth ................ G09F 17/00 116/174
1,337,237 A * 4/1920 Light .................... B61L 5/1872 116/173
1,339,849 A * 5/1920 Johnson .................. E04H 12/32 116/174

(Continued)

OTHER PUBLICATIONS

KR 20190011149 A; Gyeol, "The Flag Pole of the Rotating Type", 2019. (Year: 2019).*

(Continued)

*Primary Examiner* — Peter J Macchiarolo
*Assistant Examiner* — Tania Courson
(74) *Attorney, Agent, or Firm* — Maschoff Brennan

(57) ABSTRACT

The present invention relates to a fag hoisting pole with key characteristics in that a "rainwater adhesion suppressing rod" is installed at a top end of a flag hanging steel bar provided with an upper "fixed structure" P and a lower "rotating structure" Q to execute a "rotation method", so as to inhibit a surface adhesion phenomenon of a large flag wet in the rain while minimizing an adhesion area thereof, and at the same time, an adhesion part becomes a starting point for inducing ventilation into the adhesion part, whereby a speed of unfolding the large flag from the surface adhesion part thereof to the original state can be maximized.

7 Claims, 12 Drawing Sheets

(56) References Cited

U.S. PATENT DOCUMENTS

| | | | | | |
|---|---|---|---|---|---|
| 1,476,426 | A * | 12/1923 | Short | E04H 12/32 | 116/174 |
| 1,610,663 | A * | 12/1926 | Diago | E04H 12/32 | 116/173 |
| 2,507,623 | A * | 5/1950 | Diaz | E04H 12/32 | 248/910 |
| 2,530,654 | A * | 11/1950 | Ellis | E04H 12/32 | 116/173 |
| 2,870,559 | A * | 1/1959 | Shaughnessy | E04H 12/32 | 116/173 |
| 3,595,202 | A * | 7/1971 | Visitacion | G09F 17/00 | 52/146 |
| 4,554,885 | A * | 11/1985 | Burny, Jr. | G09F 17/00 | 116/174 |
| 6,155,018 | A * | 12/2000 | Yang | G09F 17/00 | 40/606.14 |
| 11,846,409 | B2 * | 12/2023 | Pitcher | F21V 21/116 | |

OTHER PUBLICATIONS

KR 200246070 Y1; "National Flag Revolution Equipment of National Flag Hoisting Pole", 2001. (Year: 2001).*
KR 100303045 B1; "Improved Flagpoles", 2001. (Year: 2001).*

* cited by examiner

[FIG. 1] (Prior Art)
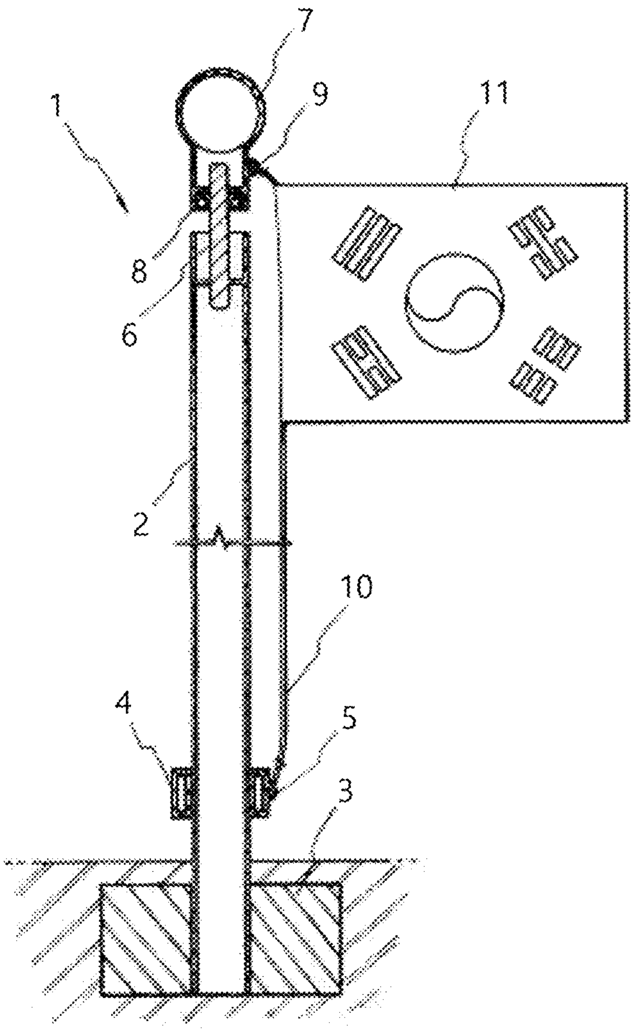

[FIG. 2] (Prior Art)
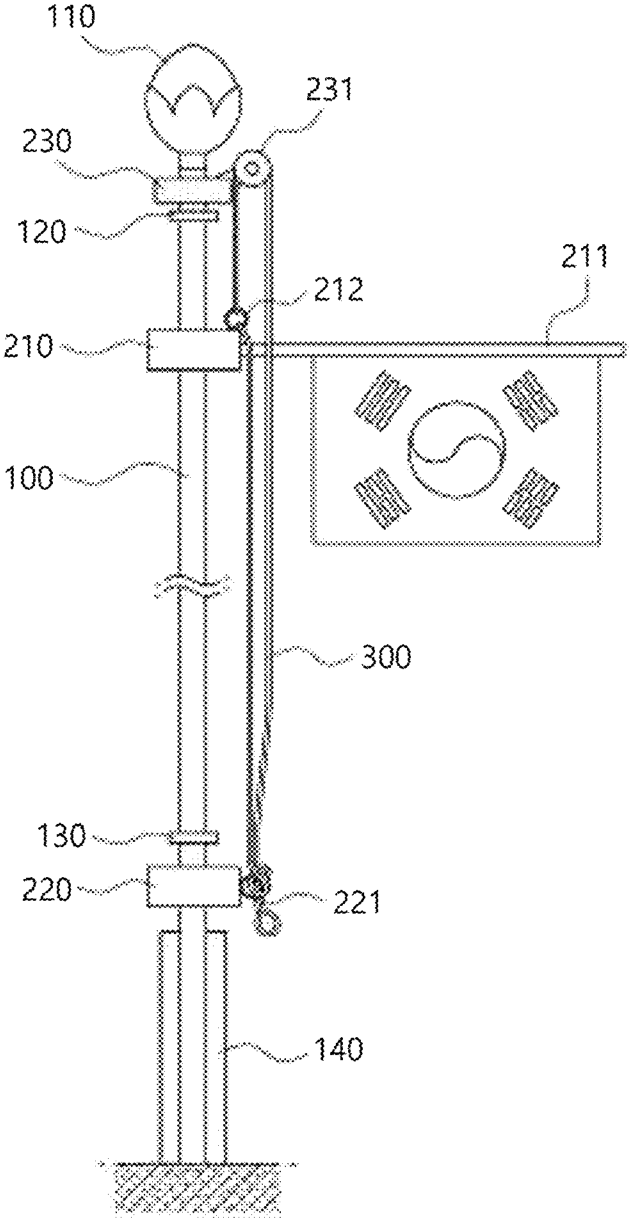

[FIG. 3] (Prior Art)
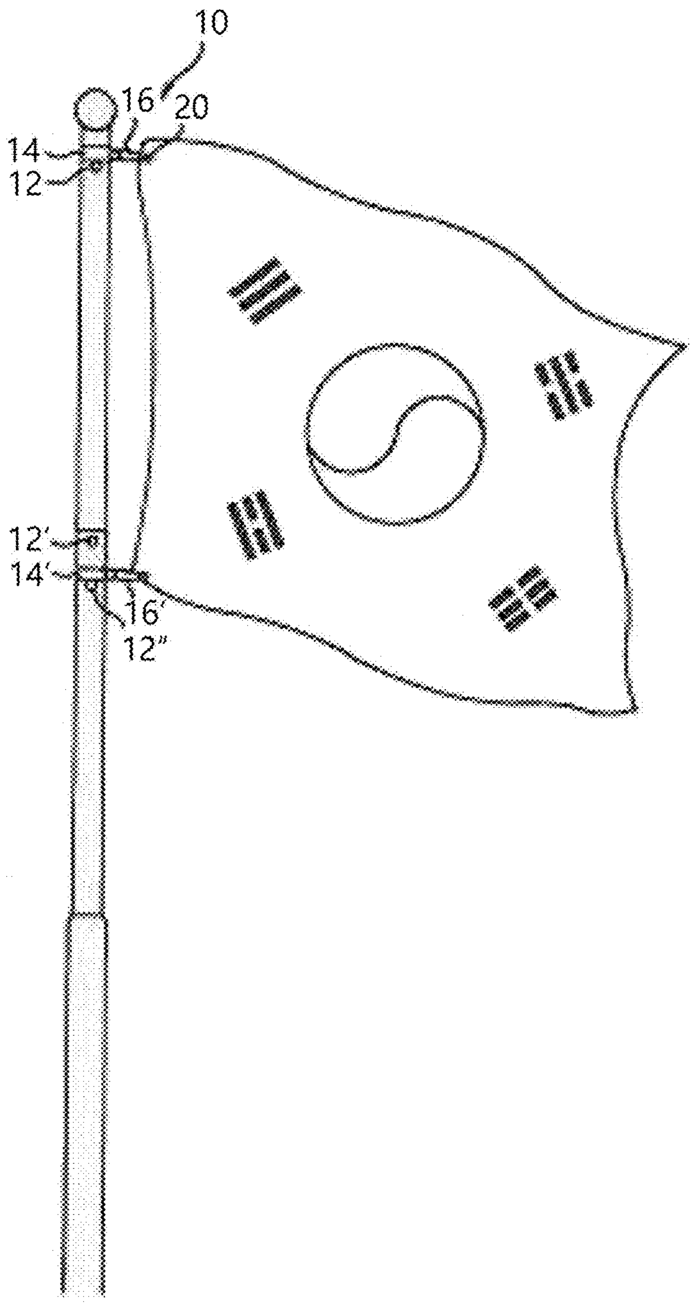

[FIG. 4] (Prior Art)
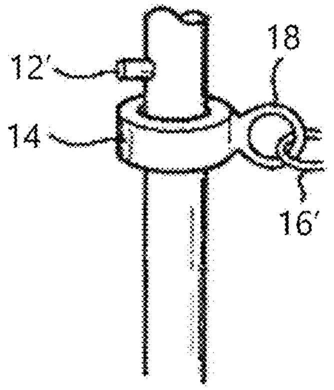

[FIG. 5]
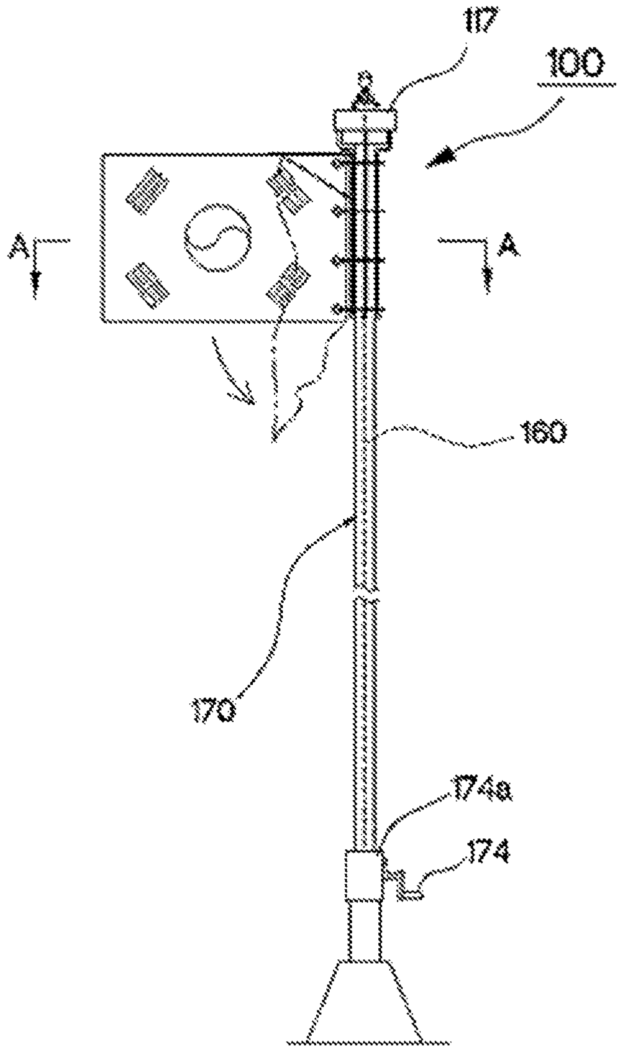

[FIG. 6]
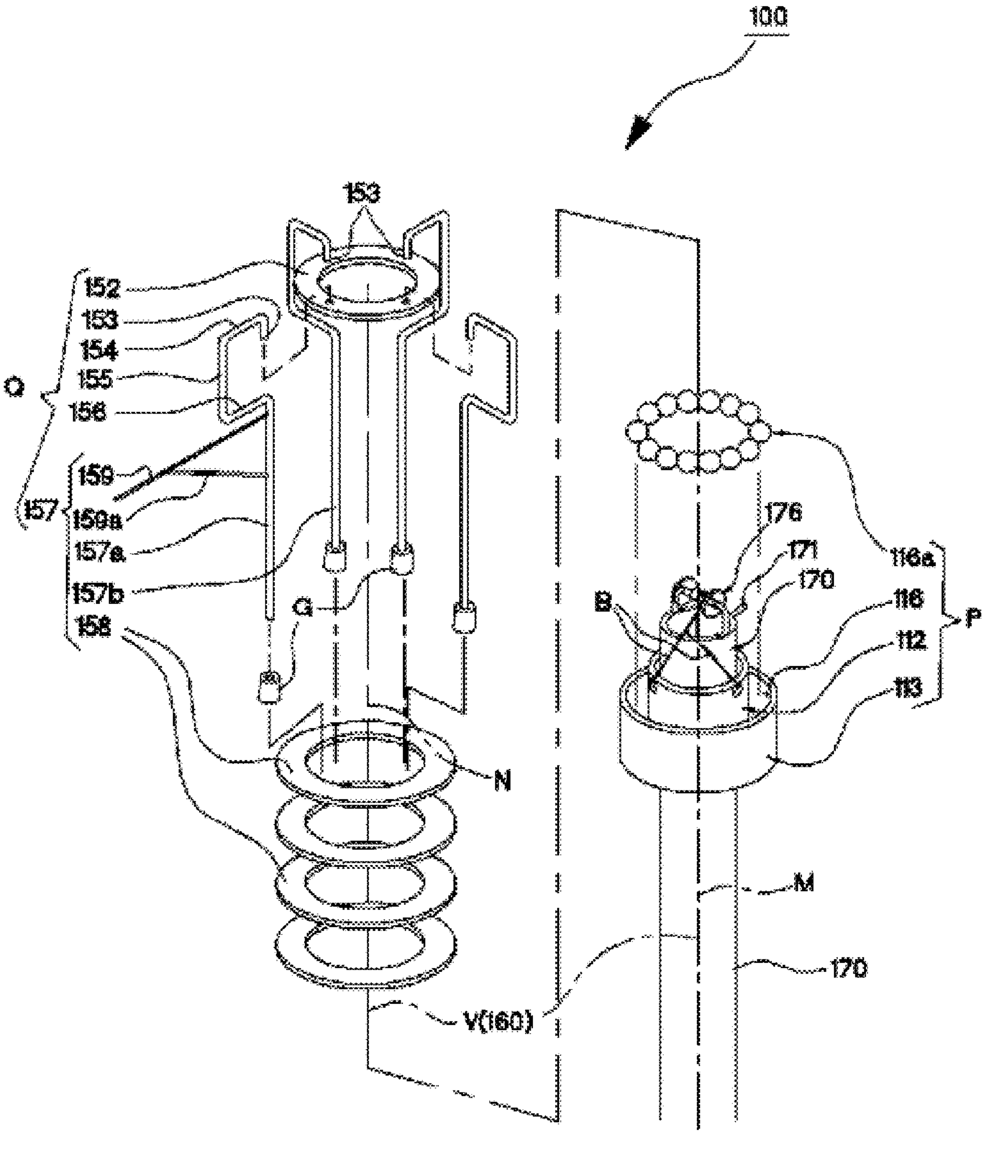

[FIG. 7]
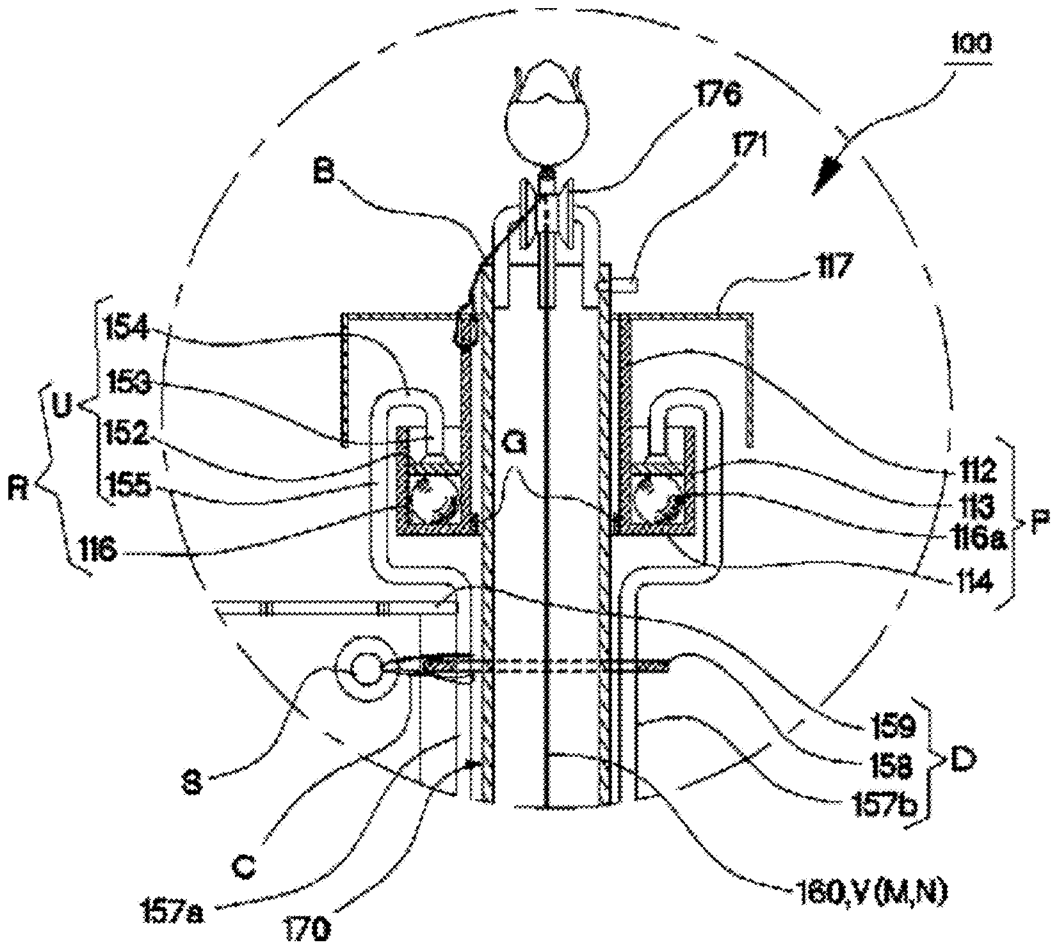

[FIG. 8]
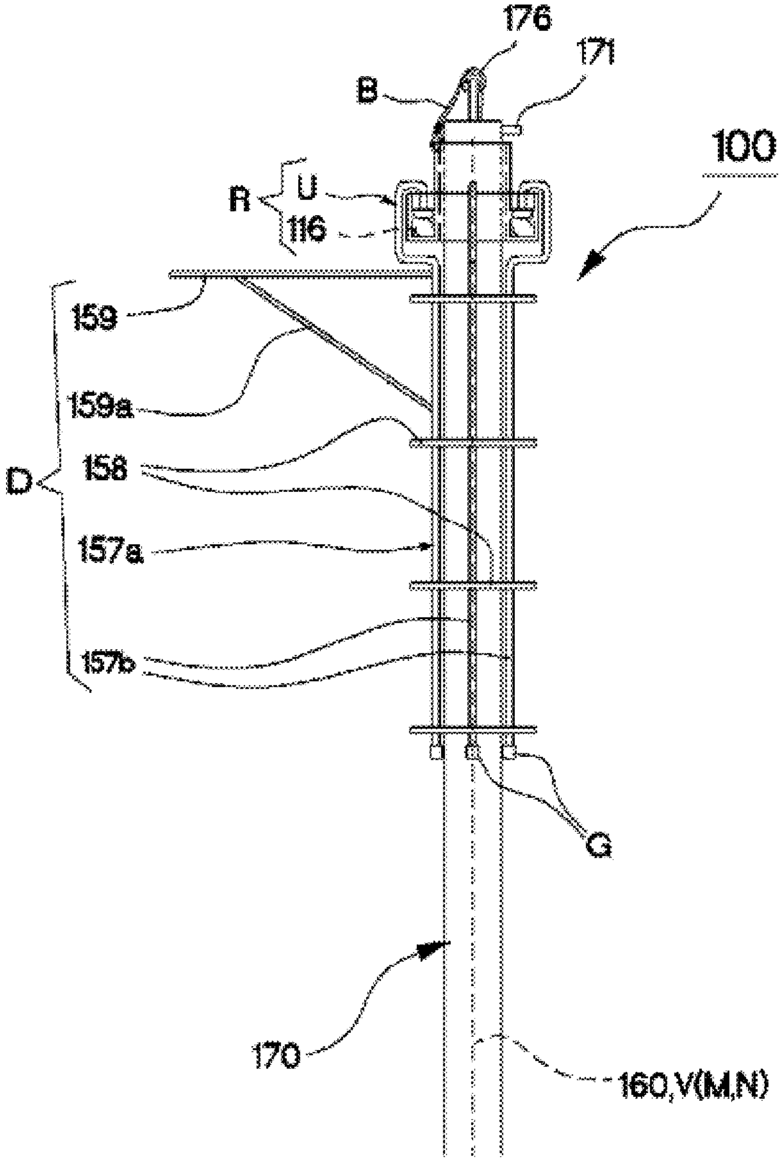

[FIG. 9]
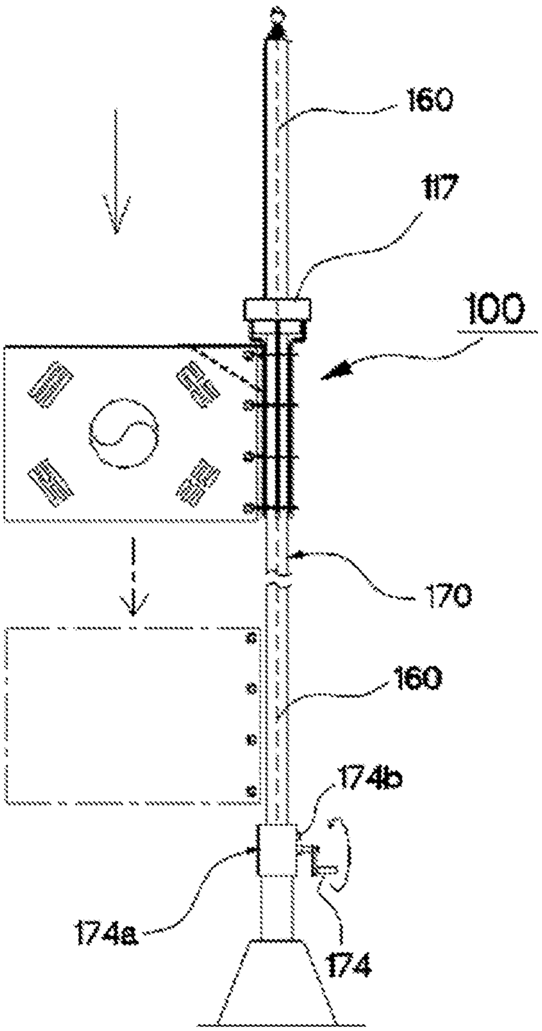

[FIG. 10]
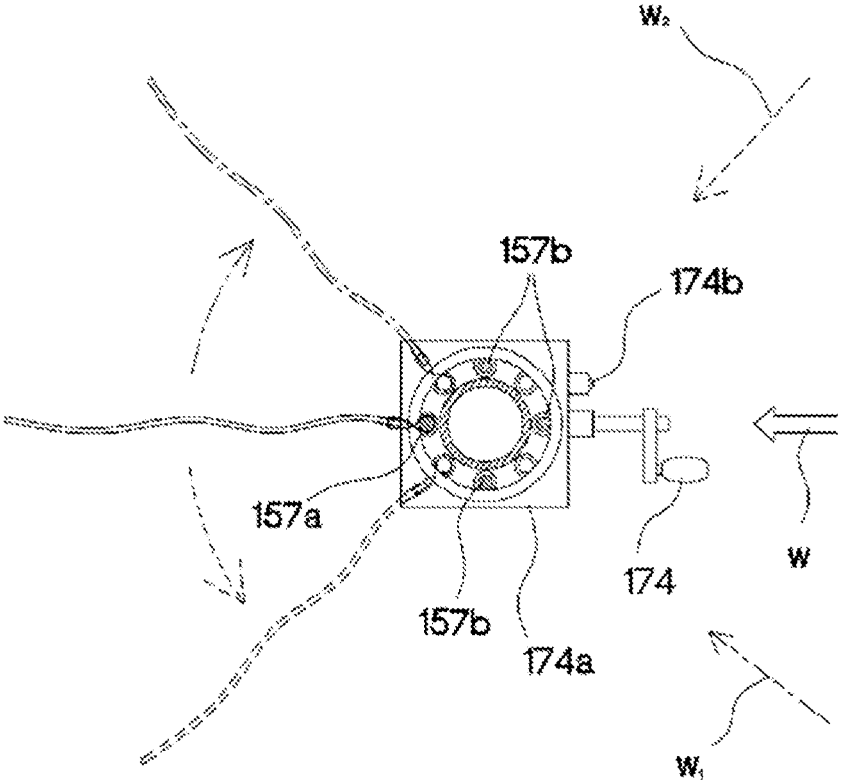

[FIG. 11]
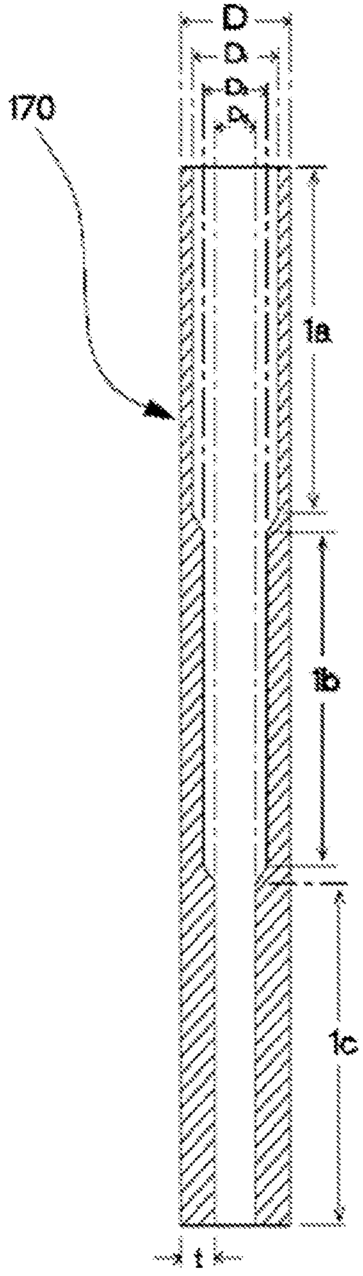

[FIG. 12]
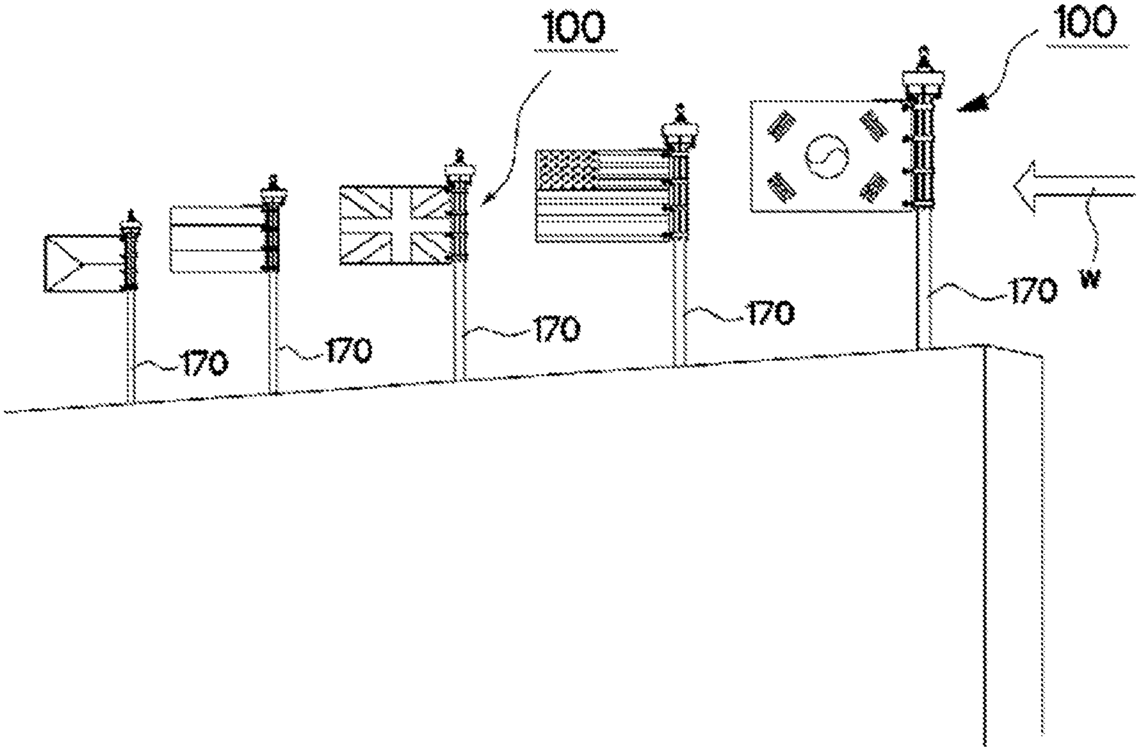

ROTATION TYPE NATIONAL FLAG HOISTING POLE TO MINIMIZE RAINWATER ADHESION AREA OF NATIONAL FLAG

FIELD OF INVENTION

The present invention relates to a rotation type flag hoisting pole that minimizes a rainwater surface adhesion area of a national flag (abbrev. to "flag"), more specifically, with key characteristics in which a "rainwater adhesion suppressing rod" is installed at a top end of a flag hanging steel bar provided with an upper "fixed structure" P and a lower "rotating structure" Q to execute a "rotation method" so as to inhibit a surface adhesion phenomenon of a large flag wetted with the rainwater while minimizing an adhesion area thereof, and at the same time, an adhesion part becomes a starting point for inducing ventilation into the adhesion part, whereby a speed of unfolding the large flag from the surface adhesion part thereof to the original state can be maximized.

There is provided an invention that, by assembling the upper "fixed structure" P and the lower "rotating structure" Q, a vertical moving body 100 comprising a rotational assembly part R is formed, and at the same time, the rotational assembly part R has dual functions, one of which is a "self-weight supporting function" to support the self-weight of the lower "rotating structure" Q with respect to the upper "fixed structure" P while the other one is a "rotation function" of the lower "rotating structure" Q, wherein a flag hanger as well as the lower "rotating structure" Q are simultaneously rotated according to the "rotation function" of the rotational assembly part R to prevent entwinement due to the "wind", while enabling "self-weight supporting function" and "rotation function", as well as "prevention of entwinement due to wind" to be efficiently and simultaneously attained by a simple structure of the rotational assembly part R.

In addition, there is provided an invention that the flag hanger rotated by the rotational assembly part R, which is an assembly of the upper "fixed structure" P and the lower "rotating structure" Q, may be formed in a strong steel bar shape unlike the conventional rope type hanger so that a flag binding part is not bent like a bow by the wind but always maintains flag binding in a vertical and straight line, thereby keeping more beautiful appearance of the flag.

Further, there is provided an invention that, in a state in which the vertical moving body 100 in a symmetrical structure is installed on a hoisting pole, an up-down rope is mounted on a single center vertical line V on which an inner diameter center vertical line M and a center vertical line N of the vertical moving body 100 coincide with each other so that the up-down rope becomes a symmetrical center line of the vertical moving body 100, and thus the up-down rope and the vertical moving body 100 move up and down simultaneously, whereby up-down movement of the vertical moving body 100 always retains a balance without eccentricity while being efficiently performed.

BACKGROUND OF INVENTION

In general, lifting and lowering a flag along a flag hoisting pole are performed by a rope in an up-down movement manner.

A typical rope up-down movement method is disclosed in Korean Registered Utility Model No. 20-0246070 (referred to as prior art 1). The up-down rope is exposed to the outside of the hoisting pole as shown in FIG. 1.

First, looking at common problems of the rope up-down movement method is as follows.

As shown in FIG. 1, the flag is hung on an up-down rope provided outside the hoisting pole, and the rope is bent like a bow by the wind. As a result, the flag hanging on the rope may also be bent like a bow along with the rope. Since a vertical line of the flag is bent in a bow shape of the rope, there is a problem in that appearance of the flag deviating from the vertical line is ugly. Such a phenomenon due to the above problem is conspicuously exhibited on the flag hoisting pole at an international event site where many national flags are hoisted in one place.

Korean Patent Laid-Open Publication No. 10-2019-0011149 (referred to as prior art 2) disclosed a method of suspending a flag on a horizontal flag hanger rod 211 as shown in FIG. 2 in a horizontal direction while taking a rope up-down mode instead of the method for hanging a flag on an up-down rope vertically.

Since the prior art 2 did not adopt a structure in which the flag is hung on the up-down rope, there is no problem in that the vertical line of the flag is bent like a bow as in the prior art 1. However, as shown in FIG. 4, a problem of the flag being entwined around the horizontal flag hanger rod 211 is unavoidable.

Herein, both the prior arts 1 and 2 take a rotating method as well as a rope up-down mode. That is, both of the prior arts 1 and 2 disclosed a horizontal rotation method that rotates horizontally with respect to the vertical line of a hoisting pole. Accordingly, in the prior art 1, the flag hanging vertically on the rope may rotate horizontally with the wind, thereby preventing the flag from being entwined around the hoisting pole. On the other hand, according to the prior art 2, the flag has a structure that is hung on a strong horizontal flag hanger rod as shown in FIG. 2 and thus may not be wound around the hoisting pole. Therefore, the horizontal rotation method of the prior art 2 has nothing to do with the entwinement around the hoisting pole, however, this horizontal rotation method also does not prevent the flag from being entwined around the horizontal flag hanger rod 211. This is because, with respect to the horizontal flag hanger rod 211, a vertical rotation method is required to prevent the entwinement of the flag around the horizontal flag hanger rod 211. Furthermore, the horizontal rotation method of the prior art 2 has absolutely nothing to do with the prevention of entwinement of the flag around the horizontal flag hanger rod 211.

Next, Korean Registered Patent No. 10-0303045 (referred to as prior art 3) disclosed that a rotation method in a rope up-down mode wherein a rope is located inside a hoisting pole (see FIG. 3).

The prior art 3 relates to a rotation method using upper and lower wind direction rotational rings 14, 14' so as to prevent a flag from being entwined around a hoisting pole. However, this is a structure in which the flag is hung on the upper and lower wind direction rotational rings 14 and 14'. However, there is no separate means for holding the flag between the upper and lower wind direction rotational rings 14 and 14'. That is, there is only the flag between the upper and lower wind direction rotational rings 14 and 14'. In this case, the structure has a margin width through which the upper and lower wind direction rotational rings 14 and 14 can slid up and down. Due to such an up-down sliding margin width, there is a problem in that, as the flag is bent like a bow by the wind as shown in FIG. 3, appearance of the hoisted flag becomes ugly. At this time, a sliding width of the lower wind direction rotational ring 14' is between a third projection 12" and a second projection 12' while a sliding width of the upper wind direction rotational ring 14 ranges from a first projection 12 up to the top.

Further, the above structure is also provided with an up-down roller along with the up-down rope in a narrow inner diameter of the hoisting pole, wherein the up-down rope disposed in the inner diameter has no special function other than serving to move a lifting member 130 up and down.

Meanwhile, all of the prior arts 1, 2 and 3 adopt a rotation method for preventing entwinement around a hoisting pole due to the wind. However, there is no description of the issue of "surface adhesion of a large flag wetted with the rainwater". The larger the area of the large national flag wetted with rainwater, the much slower a rate of restoration of the flag to its original state. Even in such state, the large flag could not be lowered. This is because the rope does not work downward. Accordingly, there is a problem in that the unsightly appearance of the hoisted flag has no choice but to continue as it is in that state.

SUMMARY OF INVENTION

Technical Problem to be Solved (a) It is an object of the present invention to install a "rainwater adhesion suppressing rod" at a top end of a flag hanging steel bar provided with an upper "fixed structure" P and a lower "rotating structure" Q to execute a "rotation method" so as to inhibit a surface adhesion phenomenon of a large flag wetted with the rainwater while minimizing an adhesion area thereof, and at the same time, to allow an adhesion part to become a starting point for inducing ventilation into the adhesion part, whereby a speed of unfolding the large flag from the surface adhesion part thereof to the original state can be maximized.

(b) Another object of the present invention is to form a vertical moving body 100 comprising a rotational assembly part R by assembling the upper "fixed structure" P and the lower "rotating structure" Q, and at the same time, to impart dual functions to the rotational assembly part R, one of which is a "self-weight supporting function" to support the self-weight of the lower "rotating structure" Q with respect to the upper "fixed structure" P while the other one is a "rotation function" of the lower "rotating structure" Q, wherein a flag hanger as well as the lower "rotating structure" Q are simultaneously rotated by the "rotation function" of the rotational assembly part R to prevent entwinement due to the "wind", while enabling "self-weight supporting function" and "rotation function", as well as "prevention of entwinement due to wind" to be efficiently and simultaneously attained by a simple structure of the rotational assembly part R.

(c) A further object of the present invention is to form a flag hanger in a strong steel bar shape unlike the conventional rope type hanger, wherein the flag hanger is rotated by the rotational assembly part R, which is an assembly of the upper "fixed structure" P and the lower "rotating structure" Q, so that a flag binding part is not bent like a bow by the wind but always maintains flag binding in a vertical and straight line, thereby keeping more beautiful appearance of the flag.

(d) A still further object of the present invention is to mount an up-down rope on a single center vertical line V on which an inner diameter center vertical line M and a center vertical line N of the vertical moving body 100 coincide with each other, in a state in which the vertical moving body 100 in a symmetrical structure is installed on a hoisting pole, so that the up-down rope becomes a symmetrical center line of the vertical moving body 100, and thus the up-down rope and the vertical moving body 100 move up and down simultaneously, whereby up-down movement of the vertical moving body 100 always retains a balance without eccentricity while being efficiently performed.

Technical Solution

The configuration of a flag hoisting pole in a rotation mode for minimizing a surface adhesion area of a flag with the rainwater ("rainwater surface adhesion area") according to the present invention will be described as follows.

With regard to a flag hoisting pole in an up-down rope manner, the flag hoisting pole is in a rotation manner to minimize a rainwater surface adhesion area of a flag and is characterized in that, in a state in which a vertical moving body 100 is installed on a hoisting pole 170, one string of up-down rope 160 may be mounted on a single center vertical line V on which an inner diameter center vertical line M of the hoisting pole and a center vertical line N of the vertical moving body 100 coincide with each other, wherein the one string ranges from a handle 174 to a direction switching roller 176, an extension of the above string is the other string switched through the direction switching roller 176, and the above other string is fixed to the top end of an inner vertical part 112 of an upper "fixed structure" P, meanwhile, the vertical moving body 100 ascending by the up-down rope 160 may have a structure, which is an assembly comprising the upper "fixed structure" P and a lower "rotating structure" Q while forming a symmetrical structure with respect to the single center vertical line V, wherein the above both structures P and Q are assembled to form a rotational assembly part R, this rotational assembly part R is an assembly formed by a receiving part 116 of the upper "fixed structure" P and an upper rotating part U of the lower "rotating structure" Q, while a lower rotating part D is an extension of the upper rotating part U and is a vertical flag hanger 157 on which a rainwater adhesion suppressing rod 159 is installed and fixed, and wherein the lower rotating part D rotates simultaneously with rotation of the upper rotating part U of the rotational assembly part R.

Further, the flag hoisting pole in a rotation manner to minimize a rainwater surface adhesion area of a flag is characterized in that a circular bearing **116*a* may be disposed inside the receiving part 116 formed by an inner vertical part 112, an outer vertical part 113 and a horizontal part 114 of the upper "fixed structure" P, and a press rotary plate 152** of the upper rotation part U may be inserted and assembled thereon, so as to smoothly rotate the upper rotation part U.

Further, the flag hoisting pole in a rotation manner to minimize a rainwater surface adhesion area of a flag is characterized in that the upper rotation part U of the rotational assembly part R may be a connection part in which the press rotary plate 152, a press supporting rod 153, a horizontal connection rod 154, and a vertical connection rod 155 are sequentially connected, and the corresponding lower rotation part D may be the flag hanger 157 in a "vertical structure along a circumference (a "circumferential vertical structure") F", wherein the upper and lower rotation parts U and D are simultaneously rotated along a wind direction.

Not only the above, the flag hoisting pole in a rotation manner to minimize a rainwater surface adhesion area of a flag is characterized in that a length of the rainwater adhesion suppressing rod 159 may be ⅛ to ¼ of a transverse width of the flag, and surface adhesion due to the rainwater may be inhibited and minimized by the length while providing a starting point for inducing ventilation into the adhesion part.

Further, the flag hoisting pole in a rotation manner to minimize a rainwater surface adhesion area of a flag is characterized in that a "circumferential vertical structure F" of the flag hanger 157 may be a steel bar having the same diameter with respect to the center vertical line N of the vertical moving body 100 and may be a symmetrical structure consisting of a flag hanging steel bar 157*a* and a supporting steel bar 157*b*, wherein "the circumferential vertical structure F" is fixed by a plurality of horizontal support rotational rings 158.

Further, the flag hoisting pole in a rotation manner to minimize a rainwater surface adhesion area of a flag is characterized in that the center of a direction switching roller 176 fixed at the top of hoisting pole 170 is located on the same line of the up-down rope mounted on the single center vertical line V, and the vertical moving body 100 in a symmetrical structure to move vertically along the up-down rope may always execute a balance movement without any eccentricity.

Not only the above, the flag hoisting pole in a rotation manner to minimize a rainwater surface adhesion area of a flag is characterized in that, in order to reinforce rigidity of the inner diameter of the hoisting pole 170, which is a cantilever structure having the same outer diameter, stepwise reinforcing the rigidity of the inner diameter may be performed by maximizing a thickness of the inner diameter near a lower ground surface while gradually decreasing the same as it goes up therefrom.

Further, the flag hoisting pole in a rotation manner to minimize a rainwater surface adhesion area of a flag is characterized in that the up-down rope 160 on the single center vertical line V starting from the handle 174 is parallel to a rope extension in a direction switched through the direction switching roller 176, and another connection rope may be fixed on a top end of the inner vertical part 112 of the upper "fixed structure" P by additional two extended connection ropes, wherein the fixation is symmetrical with respect to the single center vertical line V and a center line of the direction switching roller 176.

As such, the present invention has essential characteristics in that the "rainwater adhesion suppressing rod 159" is installed on the flag hanging steel bar 157*a* in the lower "rotating structure" Q in a rotation manner with respect to the upper "fixed structure" P, whereby a surface adhesion area of a large flag wetted with the "rainwater" is restricted and minimized and, with regard to the minimized surface adhesion part, a starting point for inducing ventilation into the surface adhesion part is provided by the "rainwater adhesion suppressing rod 159" while maximizing a speed of unfolding the flag into its original state, simultaneously.

Effect of Invention (a) The present invention may attain the following functional effects: the "rainwater adhesion suppressing rod" is installed at a top end of the flag hanging steel bar provided with an upper "fixed structure" P and a lower "rotating structure" Q to execute a "rotation method" so as to inhibit a surface adhesion phenomenon of a large flag wetted with the rainwater while minimizing an adhesion area thereof, and at the same time, to allow an adhesion part to become a starting point for inducing ventilation into the adhesion part, whereby a speed of unfolding the large flag from the surface adhesion part thereof to the original state can be maximized;

(b) a vertical moving body 100 comprising a rotational assembly part by assembling the upper "fixed structure" P and the lower "rotating structure" Q is formed, and at the same time, dual functions are imparted to the rotational assembly part R, one of which is a "self-weight supporting function" to support the self-weight of the lower "rotating structure" Q with respect to the upper "fixed structure" P while the other one is a "rotation function" of the lower "rotating structure" Q, wherein a flag hanger as well as the lower "rotating structure" Q may be simultaneously rotated according to the "rotation function" of the rotational assembly part R to prevent entwinement due to the "wind", while enabling "self-weight supporting function" and "rotation function", as well as "prevention of entwinement due to wind" to be efficiently and simultaneously attained by a simple structure of the rotational assembly part R;

(c) a flag hanger is formed in a strong steel bar shape unlike the conventional rope type hanger, wherein the flag hanger is rotated by the rotational assembly part R, which is an assembly of the upper "fixed structure" P and the lower "rotating structure" Q, so that a flag binding part may not be bent like a bow by the wind but always maintain flag binding in a vertical and straight line, thereby keeping more beautiful appearance of the flag; and (d) an up-down rope is mounted on a single center vertical line V on which an inner diameter center vertical line M and a center vertical line N of the vertical moving body 100 coincide with each other in a state in which the vertical moving body 100 in a symmetrical structure is installed on a hoisting pole, so that the up-down rope may become a symmetrical center line of the vertical moving body 100, and thus the up-down rope and the vertical moving body 100 may move up and down simultaneously, whereby up-down movement of the vertical moving body 100 can always retain a balance without eccentricity while being efficiently performed.

BRIEF DESCRIPTION OF DRAWINGS

FIG. 1 is a state diagram of the prior art 1 n a rotation manner and a rope up-down manner.

FIG. 2 is a state diagram of the prior art 2 in rotation manner and a rope up-down manner.

FIG. 3 is a state diagram of the prior art 3 in a rotation manner and a rope up-down manner.

FIG. 4 is a state diagram illustrating a connection ring shown in FIG. 3.

FIG. 5 is a state diagram illustrating a flag hoisted by the vertical moving body 100 according to the present invention.

FIG. 6 is an exploded perspective view of the vertical moving body 100 according to the present invention.

FIG. 7 is an assembly state diagram of essential configurations shown in FIG. 6

FIG. 8 is a state diagram illustrating a rotational assembly part R and upper and lower rotating parts U and D of the vertical moving body 100 according to the present invention.

FIG. 9 is a state diagram illustrating a state of the national flag descending by the vertical moving body 100 according to the present invention.

FIG. 10 is a cross-sectional view take along line A-A in FIG. 4.

FIG. 11 is a cross-sectional view of the hoisting pole reinforced in a stepwise manner.

FIG. 12 is a state diagram illustrating the flag hoisted by the vertical moving body 100 according to the present invention.

DETAILED DESCRIPTION OF PREFERRED EMBODIMENTS OF INVENTION

The configuration of the flag hoisting pole in a rotation manner to minimize a rainwater surface adhesion area of a flag according to the present invention will be described in detail with the accompanying drawings as follows.

The vertical moving body 100 may be an assembly comprising an upper "fixed structure" P and a lower "rotating structure" Q.

With respect to the upper "fixed structure" F, the lower "rotating structure" Q is a rotational structure.

The lower "rotating structure" Q is divided into upper and lower rotating parts U and D based on a horizontal connection part 156. Although the actual lower "rotating structure" Q is a single integrated rotational member, it has been divided as above for convenience of explanation.

First, the rotational assembly part R will be described as follows (see FIGS. 7 and 8).

The rotational assembly part R may be an assembly comprising the upper "fixed structure" P and the lower "rotating structure" Q.

In other words, the rotational assembly part R may be an assembly comprising a receiving part 116 of the upper "fixed structure P and an upper rotating part U of the lower "rotating structure" Q, while a lower rotational part D thereof is disposed on an extension of the upper rotating part U. The upper and lower rotating parts U and D are included in the lower "rotating structure" Q.

The upper rotating part U of the rotational assembly part R may be a single connection part in which the press rotary plate 152, a press supporting rod 153, a horizontal connection rod 154, and a vertical connection rod 155 are sequentially connected.

The press rotary plate 152 and the press supporting rod 153 welded and fixed thereto among the upper rotating part U may be inserted and assembled in the receiving part 116 of the "fixed structure" P.

With respect to the upper rotating part U, the lower rotating part D may be a flag hanger 157 in a steel bar shape comprising a "circumferential vertical structure F".

The "circumferential vertical structure F" of the flag hanger 157 is a steel bar having the same diameter with respect to the center vertical line N of the vertical moving body 100, and may have a symmetrical structure consisting of a flag hanging steel bar 157*a* and a supporting steel bar 157*b*. The "circumferential vertical structure F" may be fixed through welding with a plurality of horizontal support rotational rings 158. The flag hanging steel bar 157*a* may be a steel bar to which the flag is bound. The supporting steel bar 157*b* may be a support member to constitute the "circumferential vertical structure F" of the flag hanger 157 together with the flag hanging steel bar 157*a*. The number of the support members is preferably four (4) in order to form a symmetrical structure with respect to the center vertical line N of the vertical moving body 100. As the four support members, the flag hanging steel bar 157*a* and the supporting steel bar 157*b* are preferably steel bars having the same diameter made of the same solid material for symmetry.

The rainwater adhesion suppressing rod 159 may be installed and fixed at a top end of the flag hanging steel bar 157*a*.

The up and down rotating parts U and D may be interlinked to rotate at the same time.

With respect to the upper "fixed structure" P, the lower "rotating structure" Q may be rotated by the rotational assembly part R.

According to the wind direction, the lower "rotating structure" Q ("the flag hanger 157") may rotate simultaneously with rotation of the upper rotating part U of the rotational assembly part R.

The rotational assembly part R may perform dual functions.

One of the functions is "self-weight supporting function" that supports the self-weight of the lower "rotating structure" Q with respect to the upper "Fixed structure" P, while the other is "rotation function" to rotate the lower "rotating structure" Q.

The rotational assembly part R is preferably provided with a circular bearing 116*a* in the receiving part 116 since the press rotary plate 152 of the upper rotating part U rotates within the receiving part 116 of the upper "Fixed structure" P.

Second, the center vertical line N of the vertical moving body 100 will be described in detail as follows (see FIGS. 6, 7 and 8).

The vertical moving body 100 has a symmetrical structure with respect to the center vertical line N.

The upper "fixed structure" P and the lower "rotating structure" Q may also have a symmetrical structure with respect to the center vertical line N.

Further, the center vertical line N of the ascending and descending vertical moving body 100 may coincide with the inner diameter center vertical line M of the hoisting pole having the same outer diameter.

The flag hanger 157 of the "circumferential vertical structure F" may form a symmetrical structure with respect to the center vertical line N.

The horizontal support rotational ring 158 is a "weld-fixed member" of the "circumferential vertical structure F" and, at the same time, a "horizontal support member" for the lower "rotating structure Q".

A large flag is bound to only the flag hanging steel bar 157*a* on which the rainwater adhesion suppressing rod 159 is installed, so as to always maintain a vertical straight line, thereby having beautiful appearance.

Third, the rainwater adhesion suppressing rod 159 will be described in detail as follows (see FIGS. 6, 7 and 8).

The rainwater adhesion suppressing rod 159 installed and fixed at the top end of the flag hanging steel bar 157*a* is a horizontal member made of a strong steel bar in order to support the weight of a large national flag wetted with the rainwater while inhibiting surface adhesion thereof. As shown in FIG. 8, it is preferable to install an inclined reinforcing bar 159*a* that reinforces the horizontal rainwater adhesion suppressing rod 159.

Herein, the rainwater adhesion suppressing rod 159 is only a member for inhibiting surface adhesion, but is not a flag hanger rod for hanging the national flag. This is because the flag is already bound on the flag hanging steel bar 157*a* of the vertical flag hanger 157.

Main functions of the rainwater adhesion suppressing rod 159 are to inhibit surface adhesion of a large (national) flag wetted in the rain, to minimize an adhesion area, and at the same time, to provide and adhesion part as a starting point for inducing ventilation into the adhesion part (see FIG. 1).

In order to implement the above functions, a length of the rainwater adhesion suppressing rod 159 is preferably ⅛ to ¼ of a flag width in a transverse direction.

If the length of the rainwater adhesion suppressing rod 159 exceeds ¼ of the flag width, compared to an efficient advantage of providing a starting point for inducing ventilation into the adhesion part with respect to the surface adhesion of a large flag wet in the "rain", it entails greater disadvantages of harmful effects such as wind pressure applied to the large flag unfolded (or spreading) due to the rainwater adhesion suppressing rod 159, in particular, strong wind pressure such as typhoons.

Among such harmful effects, the wind pressure applied in a state where the large flag is unfolded by the vertical flag hanging steel bar 157*a* as well as the horizontal rainwater adhesion suppressing rod 159 may be unavoidable. Specifically, as the wind pressure is continuously applied and as the length of the rainwater adhesion suppressing rod 159 increases, a magnitude of the wind pressure may also increase. Eventually, the flag hanging steel bar 157*a* as well as the rainwater adhesion suppressing rod 159 cannot withstand the pressure and be damaged, hence causing harmful effects of stopping operation of the vertical moving body 100.

Further, when the length of the rainwater adhesion suppressing rod 159 is less than ⅛ of the flag width, a starting point for inducing ventilation into a surface adhesion part with respect to the surface adhesion of the large flag itself wet in the "rain" is very little provided, therefore, a speed of unfolding the flag to its original state also does almost not exist, thus making it inefficient.

Fourth, a relationship between the inner diameter center vertical line M of the hoisting pole, the center vertical line N of the vertical moving body 100 and the up-down rope will be described in detail as follows (see FIGS. 6, 7 and 8).

In a state in which the vertical moving body 100 is installed on the hoisting pole, a center line on which the inner diameter center vertical line M of the hoisting pole and the center vertical line N of the vertical moving body 100 coincide with each other is specifically called a single center vertical line V.

The hoisting pole and the vertical moving body 100 are symmetrical with respect to the single center vertical line V.

Further, the up-down rope is also mounted and positioned on the single center vertical line V.

The vertical moving body 100 is symmetrical with respect to the single center vertical line V and moves vertically along the up up-down rope, therefore, may be characterized in that the vertical moving body 100 can always be balanced without eccentricity while efficiently moving up and down.

Fifth, the binding of a large flag with the flag hanging steel bar 157*a* and the rainwater adhesion suppressing rod 159 will be described in detail as follows.

A longitudinal direction of the flag may be tied together with the flag hanging steel bar 157*a* using a connection iron string C which penetrated through a binding hole S and thus be firmly bound. The binding of the rainwater adhesion suppressing rod 159 in the transverse direction of the flag may also be bound in the same manner as described above. Since such a binding method is only typical and not special in the art, any conventional binding method may also be applied.

Sixth, ascending and descending ("elevation") of the vertical moving body 100 to which the large flag is bound will be described in detail as follows (see FIGS. 6, 7 and 8).

The elevation of the large flag may be performed by moving the flag vertically using the up-down rope 160 on the single center vertical line V.

The up-down rope 160 on the single center vertical line is a vertical line from a handle bobbin 174 to the direction switching roller 176. A switching extension for the direction-switched rope may be fixed on an inner vertical part 112 of the upper "fixed structure" P. At this time, another connection rope may be added in parallel to the extension of the switched rope. Specifically, two parallel rope switching extensions may be symmetrically fixed to the inner vertical part 112 of the upper "fixed structure" P with respect to the single center vertical line V and a center line of the direction switching roller 176.

Seventh, other configurations will be described in detail as follows (see FIGS. 10 and 11).

First, the up-down rope 160 is wound around a typical winder device 174*a* and is lifted by the handle 174. Then, the up-down rope 160 is fixed by a break button 174*b*. By means of a stopper projection 171 mounted on the uppermost end of the hoisting pole 170, the vertical moving body 100 may no longer ascend.

Second, it is preferable to install a noise prevention member G at friction contact surface positions of the vertical moving body 100 sliding on the hoisting pole 170, for example, the inner vertical part 112 of the upper "fixed structure" P, the horizontal support rotational ring 158 of the flag hanger 157, etc.

Third, a large flag may be bound to the flag hanging steel bar 157*a* by the connection iron string C passing through the binding hole S of the flag.

Forth, the installation of the vertical moving body 100 on the hoisting pole may be implemented by a general installation method. For example, one of the methods is an assembly method or a welding method. The assembly method is a method that manufactures the vertical moving body 100 in a symmetrical structure with respect to the center vertical line N as half-finished products at the factory, and then, assembles and installs the products in the field. The welding method is a method that welds and fixes the half-finished products in the field. The general installation method may involve two pre-requisites such as: (1) a condition in that the center line N of the vertical moving body 100 installed on the hoisting pole coincides with the single center vertical line V; and (2) a condition in which the elevation of the upper moving body 100 is always implemented in a sliding manner without eccentricity. As long as the above two conditions are satisfied, any installation method may be used.

As describe above, since the up-down rope 160 is mounted on a single center vertical line V and the vertical moving body 100 ascends and descends with respect to the single center vertical line V, sliding the vertical moving body 100 up and down may be more balanced while being efficiently performed. Further, by the rainwater adhesion suppressing rod 159, it is possible to inhibit surface adhesion of a large flag wet in the rain while minimizing an adhesion area thereof. In addition, according to the present invention, an adhesion part may become a starting point for inducing ventilation into the adhesion part, whereby the present invention may be useful with a characteristic in that a speed of unfolding the flag to its original state is maximized.

The invention claimed is:

1. A flag hoisting pole in an up-down rope manner, which uses a rotation method to minimize a rainwater surface adhesion area of a flag and is characterized in that, in a state in which a vertical moving body (100) is installed on a hoisting pole (170), one string of up-down rope (160) is mounted on a single center vertical line (V) on which an inner diameter center vertical line (M) of the hoisting pole and a center vertical line (N) of the vertical moving body (100) coincide with each other, wherein the one string extends from a handle (174) to a direction switching roller (176), the one string is switched through the direction switching roller (176), and is extended and fixed to a top end of an inner vertical part (112) of an upper fixed structure (P), and, the vertical moving body (100) ascending by the up-down rope (160) has a structure, which is an assembly comprising the upper fixed structure (P) and a rotating structure (Q) while forming a symmetrical structure with respect to the single center vertical line (V), wherein the structures (P) and (Q) are assembled to form a rotational assembly part (R), the rotational assembly part (R) is an assembly formed by a receiving part (116) of the upper fixed structure (P) and an upper rotating part (U) of the rotating structure (Q), while a lower rotating part (D) is assembled to the upper rotating part (U) and a vertical flag hanger (157*a*) on which a rainwater adhesion suppressing rod (159) is installed and fixed, wherein the lower rotating part (D) is configured to rotate simultaneously with the upper rotating part (U) of the rotational assembly part (R), wherein the lower rotating part (D) includes a flag hanging steel bar (157*a*), a supporting steel bar (157*b*), a plurality of horizontal support rotational rings (158) and an inclined reinforcing bar (159*a*) connected to the rainwater adhesion suppressing rod (159) and the flag hanging steel bar (157*a*), and wherein the rainwater adhesion suppressing rod (159) is disposed horizontally relative to the flag hanging steel bar (157*a*) and the inclined reinforcing bar (159*a*) is disposed inclined relative to the flag hanging steel bar (157*a*) and the rainwater adhesion suppressing rod (159) between the rainwater adhesion suppressing rod (159) and the flag hanging steel bar (157*a*) such that rainwater surface adhesion of the flag wetted in the rain is inhibited, or a rainwater surface adhesion area of the flag is minimized, or ventilation into the rainwater surface adhesion area is induced.

2. The flag hoisting pole according to claim 1, wherein a circular bearing (116*a*) is disposed inside the receiving part (116) formed by the inner vertical part (112), an outer vertical part (113) and a horizontal part (114) of the upper “fixed structure” (P), and a press rotary plate (152) of the upper rotation part (U) is inserted and assembled thereon, so as to smoothly rotate the upper rotation part (U).

3. The flag hoisting pole according to claim 1, wherein the upper rotation part (U) of the rotational assembly part (R) is a connection part in which a press rotary plate (152), a press supporting rod (153), a horizontal connection rod (154), and a vertical connection rod (155) are sequentially connected, and the corresponding lower rotation part (D) is the flag hanger in a vertical structure arranged along a circumference, wherein the upper and lower rotation parts (U) and (D) are simultaneously rotated along a wind direction.

4. The flag hoisting pole according to claim 1, wherein a length size of the rainwater adhesion suppressing rod (159) is ⅛ to ¼ of a transverse width size of the flag as the rainwater adhesion suppressing rod (159) having a length and the flag having a width.

5. The flag hoisting pole according to claim 1, wherein a center of the direction switching roller (176) fixed at the top end of hoisting pole (170) is located on the same line of the up-down rope mounted on the single center vertical line (V), and the vertical moving body (100) in a symmetrical structure to move vertically along the up-down rope is configured to execute a balanced movement.

6. The flag hoisting pole according to claim 1, wherein, in order to reinforce rigidity of an inner diameter of the hoisting pole (170), stepwise reinforcing the rigidity of the inner diameter is performed by maximizing a thickness of the inner diameter near a lower ground surface while gradually decreasing the same as it goes up therefrom.

7. The flag hoisting pole according to claim 1, wherein the up-down rope (160) on the single center vertical line (V) starting from the handle (174) is parallel to an extension of a direction-switched rope through the direction switching roller (176), and is extended to and fixed on the top end of the inner vertical part (112) of the upper fixed structure (P), wherein the up-down rope (160) and the extension of the direction-switched rope are arranged symmetrically with respect to the single center vertical line (V) and a center line of the direction switching roller (176).

* * * * *